Aug. 7, 1951 — M. TYLER — 2,563,293
TIRE REMOVING DEVICE WITH CIRCUMFERENTIALLY DISTRIBUTED THRUST MEMBERS
Filed March 24, 1948 — 2 Sheets-Sheet 2

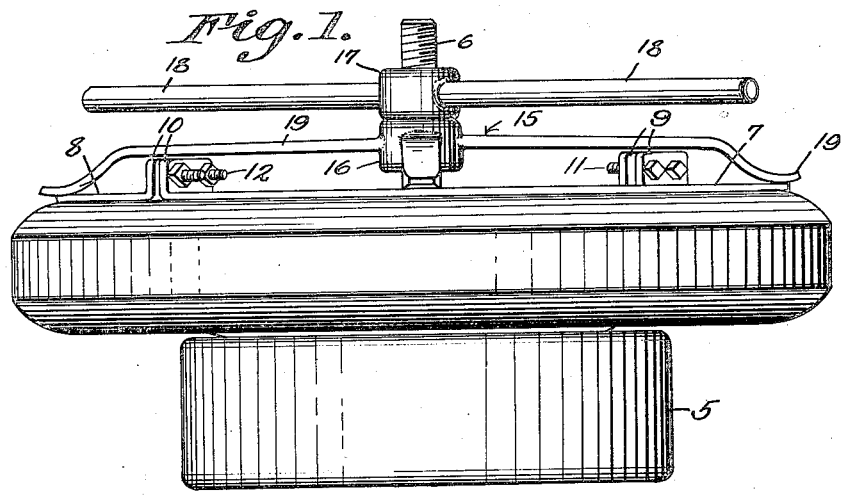
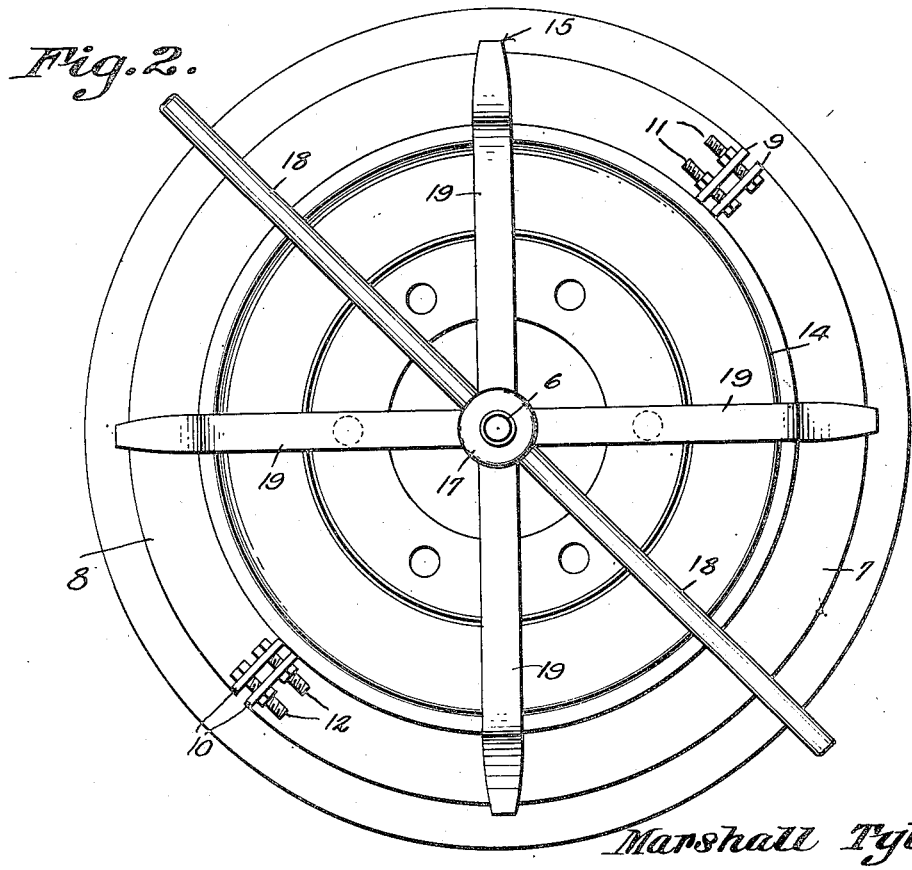

Marshall Tyler
INVENTOR

Patented Aug. 7, 1951

2,563,293

UNITED STATES PATENT OFFICE 2,563,293

**TIRE REMOVING DEVICE WITH CIRCUM-
FERENTIALLY DISTRIBUTED THRUST
MEMBERS**

Marshall Tyler, Talbotton, Ga., assignor to
C. B. Edwards, Talbotton, Ga.

Application March 24, 1948, Serial No. 16,763

1 Claim. (Cl. 157—1.2)

This invention relates to a device designed for use in removing heavy truck tires from their rims, the primary object of the invention being to provide a device of this character which may be operated to break the connection between the tire and rim should the tire become firmly secured to the rim, due to rust or corrosion.

An important object of the invention is to provide a device of this character which will direct pressure to one side of the tire, eliminating any danger of damaging the tire when directing the pressure of the device to the tire.

Another important object of the invention is to provide a split band which is so constructed and arranged that it may be forced between the tire and rim to push the tire from the rim, during the operation of the device.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings

Figure 1 is a side elevational view illustrating a truck tire and wheel positioned on the device preparatory to removing the tire from the rim.

Fig. 2 is a plan view thereof.

Figure 3:
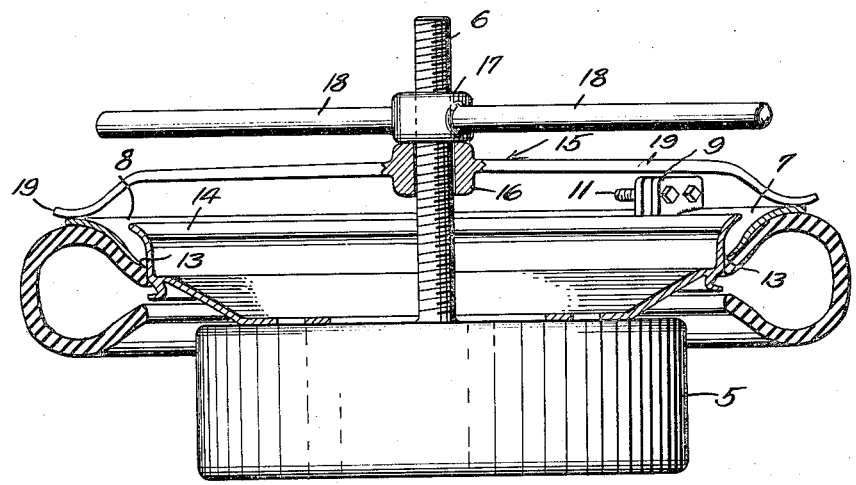
Fig. 3 is a sectional view taken vertically through the wheel and tire, the base of the device being shown in elevation.
Figure 4:
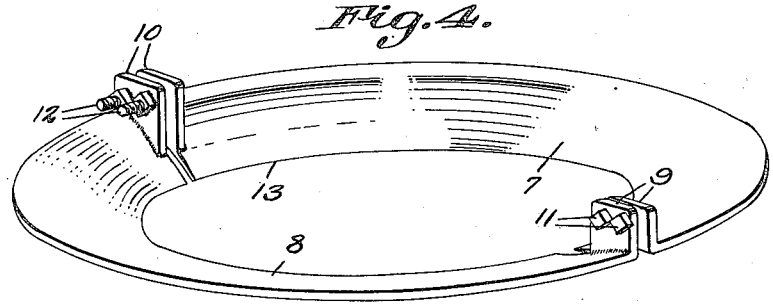
Fig. 4 is a perspective view of the split band which is disposed between the side of the tire and the edge of the rim, contacting with the tire.

Referring to the drawings in detail, the device comprises a circular base 5 from the center of which extends the screw 6, the screw 6 being of a length to extend an appreciable distance above the base, as clearly shown by Fig. 3 of the drawings.

The device includes a split band made up of sections 7 and 8, the sections 7 and 8 having cooperating flanges 9 and 10 at the ends thereof, which are formed with openings through which the bolts 11 and 12 extend, the bolts acting to draw the sections of the split band together.

As clearly shown by Fig. 3 of the drawings, the split band is slightly dished and curved to conform to the curvature of the usual tire shoe, the inner radial edge of the split band being beveled to a knife-like edge 13 which is so constructed that it may be readily forced between the tire shoe and flange 14 of the rim on which the tire shoe is positioned.

The reference character 15 indicates a spider which is formed with a hub 16 so that the hub of the spider may slide freely over the threaded screw without the necessity of rotating the spider on the screw.

Mounted for threaded movement longitudinally of the screw 6, is the pressure head 17 to which the rods 18 are connected, the rods 18 extending laterally from the pressure head so that they may be gripped and rotated when it is desired to rotate the pressure head to direct pressure against the hub 16 of the spider to move the spider to cause the arms 19 thereof to press the split band into close engagement with the tire shoe, and move the tire shoe over the rim on which it is mounted.

In the use of the device, a motor vehicle truck wheel and tire to be removed therefrom, are positioned on the base 5 in a manner as shown by Fig. 1 of the drawings.

The split band is now positioned so that the knife-like edge 13 thereof moves between the flange of the rim, and the tire shoe. The bolts 11 and 12 are now moved to draw the sections of the split band together, which creates pressure at the base or bead of the tire, forcing the bead of the tire away from the flange 14 of the rim.

The spider is now run over the screw until the arms 19 thereof engage the split band 7. Pressure is now directed to the spider by rotating the pressure head 17 with the rods 18. This pressure will of course move the split band in such a way as to force the tire from the rim breaking the seal between the tire and rim which may be caused by rust or corrosion.

From the foregoing it will be seen that due to the construction shown and described, I have provided a device for removing heavy truck tires from truck wheels without danger of damaging the tire as usually happens when the tire is subjected to the blows of the usual hammer, used in removing tires.

An even pressure is directed to the tire throughout its circumference, by this device, preventing damage regardless of how tight the tire may be secured to the rim.

Having thus described the invention, what is claimed is:

A device for removing a tire from its rim, comprising a base on which a wheel with a tire thereon is positioned, a screw rising from the central portion of the base, a split band embodying semicircular sections fitted against the side wall of the tire and extending between the tire and rim, cooperating flanges having registering openings, extending laterally from the ends of the semicircular sections, bolts extending through the registering openings adapted to draw the semicircular sections together forcing the split band between the tire and rim flange, a spider mounted on the screw for free movement longitudinally of the screw, said spider engaging the split band, a pressure head threaded on the screw, handles extending from the pressure head by means of which the pressure head is rotated exerting pressure on the pressure head and spider, whereby said split band is moved against the tire forcing the tire from its rim.

MARSHALL TYLER.

REFERENCES CITED

The following references are of record in the file of this patent:

UNITED STATES PATENTS

| Number | Name | Date |
| --- | --- | --- |
| 1,467,122 | Snell | Sept. 4, 1923 |
| 1,481,061 | Hunter | Jan. 15, 1924 |
| 1,615,469 | McKenzie | Jan. 25, 1927 |
| 1,641,083 | Hite | Aug. 30, 1927 |
| 2,034,819 | Maulis | Mar. 24, 1936 |
| 2,375,956 | Smith et al. | May 15, 1945 |
| 2,495,118 | McCollister | Jan. 17, 1950 |

FOREIGN PATENTS

| Number | Country | Date |
| --- | --- | --- |
| 612,890 | Germany | May 7, 1935 |